United States Patent
Takahashi et al.

(10) Patent No.: US 6,190,633 B1
(45) Date of Patent: Feb. 20, 2001

(54) PROCESS FOR PREPARING CALCIUM CARBONATE

(75) Inventors: Kazuto Takahashi; Kiyoshi Kanai; Yasunori Nanri; Yasuhiro Okamoto, all of Yamaguchi-ken (JP)

(73) Assignee: Nippon Paper Industries Co., Ltd., Tokyo (JP)

(*) Notice: Under 35 U.S.C. 154(b), the term of this patent shall be extended for 0 days.

(21) Appl. No.: 09/319,075

(22) PCT Filed: Dec. 9, 1997

(86) PCT No.: PCT/JP97/04515

§ 371 Date: Jun. 1, 1999

§ 102(e) Date: Jun. 1, 1999

(87) PCT Pub. No.: WO98/25852

PCT Pub. Date: Jun. 18, 1998

(30) Foreign Application Priority Data

Dec. 9, 1996 (JP) .................................... 8-344614

(51) Int. Cl.[7] ....................................... C01F 5/24
(52) U.S. Cl. ............................... 423/432; 423/430
(58) Field of Search ................... 423/430, 432

(56) References Cited

U.S. PATENT DOCUMENTS

| 2,211,908 | * | 8/1940 | O'Connor . |
| 3,268,387 | * | 8/1966 | Casciani et al. . |
| 3,268,388 | * | 8/1966 | Bauman et al. . |
| 3,627,480 | * | 12/1971 | Birchall . |
| 4,668,342 | * | 5/1987 | Blackwell . |
| 4,894,217 | * | 1/1990 | Ostman . |
| 5,741,471 | * | 4/1998 | Deutsch et al. . |

FOREIGN PATENT DOCUMENTS

| 1226719 | 9/1989 | (JP) . |
| 429606 | 5/1992 | (JP) . |

* cited by examiner

*Primary Examiner*—Steven P. Griffin
*Assistant Examiner*—Christina Ildebrando
(74) *Attorney, Agent, or Firm*—Roylance, Abrams, Berdo & Goodman, L.L.P.

(57) ABSTRACT

Inexpensive spindle- or needle-like calcium carbonate giving useful properties for bulk, brightness, opacity, wire abrasion resistance and yield as a paper filler is provided by taking advantage of the causticization step. In a first step, a quick lime having a calcium carbonate content of 10% by weight or less is slaked with a liquor having a pH of 5.5 to 13.5 at a concentration of 20 to 60% to prepare a milk of lime. In a second step, causticization reaction takes place at a green liquor loading rate of 0.02 to 0.5 cc (green liquor)/min/g (quick lime) at a reaction temperature of 20 to 105° C. to afford spindle- or needle-like calcium carbonate.

4 Claims, 7 Drawing Sheets

Example 1

Example 2

Example 3

Example 4

Comparative example 4

PROCESS FOR PREPARING CALCIUM CARBONATE

FIELD OF THE INVENTION

The present invention relates to processes for preparing calcium carbonate giving useful performances as a paper filler and a paper coating pigment in the causticization step of the sulfate or soda pulp process, and more specifically processes for preparing calcium carbonate giving useful performances as a paper filler by defining the quick lime used and slaking and causticization conditions or other factors.

PRIOR ART

Normally, a filler is internally added to printing or writing papers for the purpose of improving brightness, opacity, smoothness, writing suitability, touch, printability or other properties. Such papers are made by the so-called acid process at about pH 4.5 or the so-called neutral process at a neutral to weakly alkaline pH of 7 to 8.5 using talc, clay, titanium oxide or the like as a filler. In the neutral process, domestic calcium carbonate can be used in place of expensive imported talc or clay. In recent years, neutral paper obtained by the neutral process have attracted interest because of the paper's storability, and the number has been growing and will become increasingly widespread because of many advantages including paper quality, costs, environmental influences.

A feature of recent demands for paper is a significant growth in the field of leaflets, catalogs, pamphlets, direct mails or the like in commercial printing and in the field of books related to computer, multimedia and family computer to meet the development of the information age, magazines, collections of photographs, mooks, comics or the like in publishing. Thus, paper users increasingly desire to lower costs and seek downgraded and lighter paper.

As the demands for inexpensive and light neutral paper increase as described above, the role of calcium carbonate as a filler will become very important. Calcium carbonate used as a filler in neutral papers includes heavy calcium carbonate obtained by mechanically dry- or wet-grinding a natural limestone and precipitated calcium carbonate chemically synthesized (synthetic calcium carbonate).

However, in heavy calcium carbonate obtained by grinding a natural limestone by a mill such as ball mill it is difficult to control the shape and it severely abrades plastic wires during paper making processes when it is used as an internal filler. Moreover, normal fine-quality papers or coated papers prepared with such a filler are insufficient in bulk, brightness, opacity, smoothness, writing suitability, touch, printability and other properties.

Recent advances in weight saving make the above problem graver. High-specific surface fillers (e.g. pulverized silica, white carbon) or highly refractive fillers (e.g. titanium dioxide) have been so far used as common means for improving the opacity of light printing papers. These fillers improved opacity, but could not give firm body because they could not increase the bulk (lower the density). One possible means of increasing the bulk is to increase the freeness of the pulp used, in which case bulky paper with low density can be obtained, but the paper layer structure becomes porous thereby reducing the air permeability and smoothness. If such a porous base paper having a low air permeability is coated with a coating solution containing a pigment, the coating solution excessively penetrates the base paper to reduce the covering ability for the base paper, surface smoothness after drying, glossiness before printing and various printabilities due to the deteriorated surface with uneven glossiness. In order to solve these problems, precipitated calcium carbonate (synthetic calcium carbonate) has been used. It is known to be prepared by (1) a reaction between carbon dioxide gas and a milk of lime obtained from a calciner of lime or the like, (2) a reaction between ammonium carbonate and calcium chloride in the ammonia soda process, (3) a reaction between a milk of lime and sodium carbonate in the causticization of sodium carbonate, etc. Among these processes, (2) and (3) have been less examined with respect to how to control the shape of the resulting calcium carbonate because both reactions produce it as a by-product and are now being replaced by novel formats for obtaining the main products. On the other hand, (1) has been widely studied with respect to techniques for preparing calcium carbonate in various shapes and actually shown some examples prepared on-site in paper factories, partly because the reaction system is relatively simple (water, slaked lime, carbon dioxide gas). However, the production costs of this process are very high because calcium carbonate is the sole product and so it can not satisfy users' demands for cost-saving and can not be used, or at most in a greatly limited amount, for inexpensive types of papers.

A possible alternative is to use calcium carbonate by-produced during the causticization step for recovering and regenerating a digesting agent in a kraft pulp process, as a paper making material.

In the sulfate or soda pulp process, wood is digested with a mixed chemical solution of sodium hydroxide and sodium sulfide at high temperature under high pressure to isolate cellulose. Cellulose is separated as a solid phase and purified into pulp, while the chemical solution and other elements than cellulose eluted from the wood are recovered as a pulp waste liquor (black liquor) and concentrated and burned. During that time, the eluted elements from the wood are recovered as a heat source while inorganic matters based on sodium carbonate and sodium sulfide in the chemical solution are recovered and dissolved in water or a diluted chemical solution called weak liquor in which are dissolved a part of white liquor components generated when calcium carbonate sludge formed by the reaction shown below is washed to give a green liquor. This green liquor is mixed with a quick lime to produce calcium carbonate by the reactions (1) and (2):

$$CaO + H_2O \rightarrow Ca(OH)_2 \quad (1)$$

$$Ca(OH)_2 + Na_2CO_3 \rightarrow CaCO_3 + 2NaOH \quad (2)$$

This calcium carbonate can be prepared at very low cost because it is a by-product of the preparation of the main product white liquor. Moreover, it can be expected to improve the reactivity of the above reactions (1) and (2) and the clarity of the white liquor and to reduce waste, because the inside of the system can be clarified and the circulating lime can be highly purified by extracting calcium carbonate from the calcium circulating cycle (calcium carbonate, quick lime, slaked lime) in the causticization step which is conventionally a closed system.

However, it was difficult to control the shape of the obtained conventional calcium carbonate and it was always massive and amorphous, including various shapes such as cube or hexahedron with large particle diameters similar to conventional heavy calcium carbonate, and normal fine-quality paper or coated papers prepared with such a filler were insufficient in bulk, brightness, opacity, smoothness, writing suitability, sensation of touch, printability or other properties. With recent large-scale paper-making machines producing paper at high speed, serious problems in plastic wire abrasion resistance and wet end yield also occurred.

Thus, it was difficult to efficiently and inexpensively prepare calcium carbonate, which is useful as a filler or pigment to give a good wet end yield and plastic wire abrasion resistance during paper making processes. It was also difficult to reduce the coating amount to minimize weight while maintaining printing quality, further, it was difficult to produce bulkier and highly opaque fine-quality paper or coated paper having good body using the same coating amount.

Considering the above situation, an object of the present invention is to provide inexpensive and light calcium carbonate with a controlled shape self-generated in the causticization step, which gives a good wet end yield and plastic wire abrasion resistance during paper making processes and can be used to produce fine-quality paper or coated paper having good body, high opacity and excellent printability or other properties.

SUMMARY OF THE INVENTION

As a result of careful studies to overcome the above problems, we found that they can be solved by slaking a quick lime containing calcium carbonate at a specific level or less with a liquor having a pH of 5.5 to 13.5 to prepare a milk of lime and taking advantage of the causticization step of the sulfate or soda pulp process to continuously add a green liquor exiting the causticization step of the sulfate or soda pulp process to said milk of lime at a controlled loading rate and reaction temperature, and accomplished the present invention on the basis of this finding. According to the process of the present invention, the shape of calcium carbonate can be controlled without significant change in the conventional causticization step to prepare calcium carbonate in the form of spindle- or needle-like particles having a minimum diameter of 0.1 to 2.5 $\mu$m and a maximum diameter of 0.3 to 20 $\mu$m, which is excellent in bulk, brightness, opacity, wire abrasion resistance and wet end yield when it is used as a paper filler and which also can improve glossiness before printing, opacity, ink acceptability, surface strength as expected when it is used as a coating pigment, and can be produced at a much lower cost than calcium carbonate obtained by the conventional reaction between a milk of lime and carbon dioxide gas. Additionally, the duration of the kiln operation can be shortened by extracting calcium carbonate from the causticization step or could even be stopped depending on the amount of calcium carbonate extracted from the step to suit the necessary amount of causticized light calcium carbonate, thus saving the cost of the entire causticization step.

DETAILED DESCRIPTION OF THE INVENTION

The quick lime used during the slaking reaction of the first step of the present invention may be selected from the group consisting of (a) the calcination product of a limestone based on calcium carbonate, (b) the calcination product of calcium carbonate generated during conversion of sodium carbonate into sodium hydroxide in the causitization step of the sulfate or soda pulp process and (c) a mixture thereof. The calciner used here may be any apparatus for converting calcium carbonate into a quick lime (calcium oxide) such as Beckenbach kiln, Meltz kiln, rotary kiln, Kunii kiln, KHD kiln, fluidized calciner, vertical mixing kiln.

Among impurities in the resulting calcium carbonate, coloring elements (Fe, Mn, etc.) must be especially controlled by suitably selecting a quick lime derived from a feed limestone containing less coloring elements to meet the purpose of the product paper. In the case of a quick lime recalcined in a rotary kiln or fluidized calciner or the like during the causticization step, a feed limestone containing less coloring elements may be supplied to the calcium circulating cycle of the causticization step or a controlled amount of the quick lime resulting from the calcination thereof may be used, depending on the conditions such as the ratio between calcium carbonate extracted outside the system and calcium carbonate recirculating in the system.

The calcium carbonate content in the quick lime is 0.1 to 10% by weight on the basis of the weight of the quick lime. If it exceeds 10% by weight, amorphous or massive calcium carbonate is produced, which has a low wire abrasion resistance and can not produce light coated paper with the desired quality. A content of 0.1% or less is uneconomic, because the energy required for calcination greatly increases or the calciner must be specially designed. The particle size of the quick lime is not specifically limited, but preferably 0.01 to 30 mm. If it is 0.01 mm or less, pulverization adds to the cost and dust is created or transfer is troublesome. If it is 30 mm or more, homogeneous mixing can not be obtained by agitation during slaking.

The liquor used for slaking the quick lime has a pH of 5.5 to 13.5. This liquor may be water supplied during the causticization step or a weak liquor consisting of a supernatant of a green liquor or white liquor washed off precipitates (dregs, calcium carbonate sludge). Particularly when a weak liquor above pH 13.5 is used, the concentration of NaOH and $Na_2CO_3$ becomes higher so the wire abrasion resistance of the resulting calcium carbonate is damaged and the desired quality can not be attained. However, the water supplied during the causticization step may be at a common industrial water quality level of pH 5.5 or more without any inconvenience. If water or a weak liquor is used for slaking the quick lime, the water balance in the causticization step can be controlled by decreasing the amount of water supplied in the causticization step or the amount of the smelting weak liquor. This ensures slaking and causticization reactions without decline of the white liquor level which causes a serious problem in the operation of the causticization step.

The lime level during slaking should be 20 to 60% by weight, preferably 25 to 55% by weight on the basis of the quick lime before slaking. If it exceeds 60% by weight, the viscosity of the liquor becomes too high to practically agitate. If it is lower than 20% by weight, massive calcium carbonate particles are generated with low wire abrasion resistance, which can not attain the desired paper quality.

The quick lime and the liquor may be mixed using a means appropriately selected from conventional agitating blade- or pump-type extruders, kneaders and blenders depending on the viscosity of the liquor or slurry during mixing (see Handbook of Chemical Engineering published by Maruzen, Mar. 18, 1988).

The slaking temperature and period are closely related to each other. A short period suffices if the temperature of the aqueous solution used for slaking is high, while a long period is required if the temperature is low. The period is appropriately determined to meet the temperature condition of the quick lime used during slaking. As a standard, the reaction may be continued until the temperature rise due to heat generation during slaking stops. In practice, slaking is effective at a temperature as high as possible.

The green liquor in the causticization reaction of the second step of the present invention may be derived from the causticization step of the conventional sulfate or soda process and should be used at 80 to 160 g/L {in which $Na_2CO_3$ represents 60 to 130 g/L (expressed as $Na_2O$ in the same way as below)}, preferably 100 to 150 g/L (in which $Na_2CO_3$ represents 85 to 130 g/L) in terms of total alkali. If the total alkali is less than 80 g/L (in which $Na_2CO_3$ represents 65 g/L), the concentration of the final white liquor is lowered and should be regulated before it is used for digestion. If the total alkali is more than 160 g/L (in which $Na_2CO_3$ represents 130 g/L), however, the resulting calcium carbonate has a low wire abrasion resistance without attaining the desired paper quality.

The green liquor is mixed with said milk of lime prepared in the first step at a loading rate of the green liquor to the milk of lime of 0.02 to 0.5 cc (green liquor)/min/g (quick lime), preferably 0.02 to 0.45 cc (green liquor)/min/g (quick lime). Loading rates lower than 0.02 cc (green liquor)/min/g (quick lime) are impractical because of low productivity. If the loading rate exceeds 0.5 cc (green liquor)/min/g (quick lime), however, amorphous or massive calcium carbonate is produced to lower the wire abrasion resistance without attaining the desired paper quality.

Here, the milk of lime prepared from the quick lime in the first step may be replaced with a milk of lime prepared from calcium hydroxide at the same concentration as defined in the present invention.

The causticization reaction should be carried out at a reaction temperature of 20 to 105° C., preferably 25 to 103° C. Temperatures higher than 105° C. are uneconomic because the boiling point under atmospheric pressure is exceeded to necessitate a pressure-type causticization system or the like. If the temperature is lower than 20° C., however, amorphous or massive calcium carbonate is produced, thereby to lower the wire abrasion resistance without attaining the desired paper quality. This is also uneconomic because the system must be designed for cooling, thereby adding to the cost.

Agitation during causticization reaction may be carried out using a means appropriately selected from conventional agitating blade- or pump-type extruders, kneaders and blenders which can homogeneously mix the milk of lime prepared in the first step and a green liquor (see Handbook of Chemical Engineering published by Maruzen, Mar. 18, 1988).

Under the conditions as mentioned above, calcium carbonate in the form of spindle- or needle-like particles having a minimum diameter of 0.1 to 2.5 μm and a maximum diameter of 0.3 to 20 μm can be prepared.

Calcium carbonate in various shapes obtained by the present invention gives better yield and wire abrasion resistance as compared with calcium carbonate previously obtained in the causticization step and can be internally added to provide fine-quality paper and coated paper with firm body and excellent brightness, opacity, smoothness, writing suitability, sensation of touch, printability or other properties. From this it can be readily inferred that it can be used in newspapers, medium papers, printing papers, book papers, bill papers, dictionary papers, double-side ground wood kraft papers, bleached kraft papers, tissue papers, rice papers, Indian papers, paper boards, non-carbon papers, art papers, light coated papers, cast coated papers, wall papers, heat-sensitive papers or the like to provide them with firm body and excellent brightness, opacity, smoothness, writing suitability, sensation of touch, printability or other properties. It also can be used in various pigments to give excellent gloss, smoothness, printability or the like. In addition to papers, it can also be used in rubbers, plastics, paints, sealing agents, pressure-sensitive adhesives, fertilizers, etc.

EFFECTS OF THE INVENTION

Figure 1:
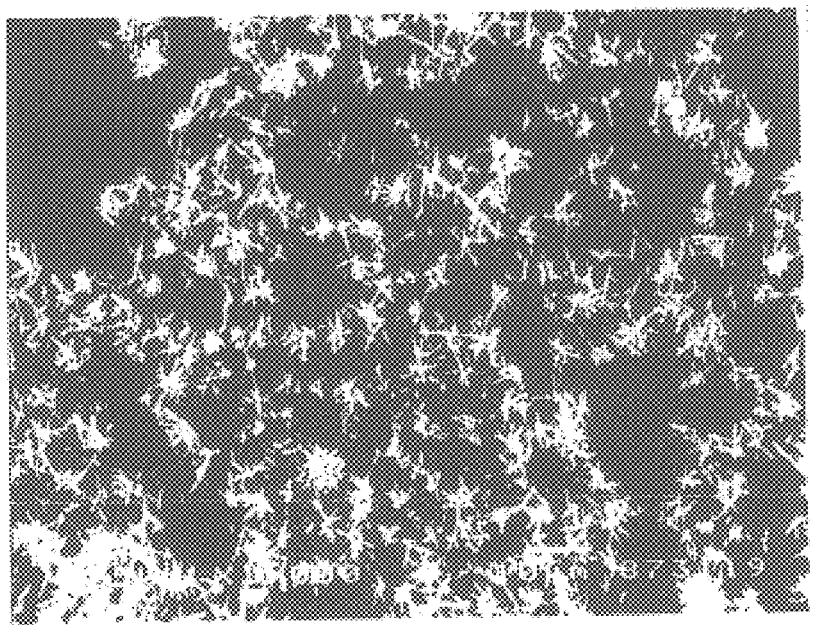
FIG. 1 is a scanning electron microphotograph showing the crystal particle structure of needle-like calcium carbonate obtained in Example 1.
Figure 1:
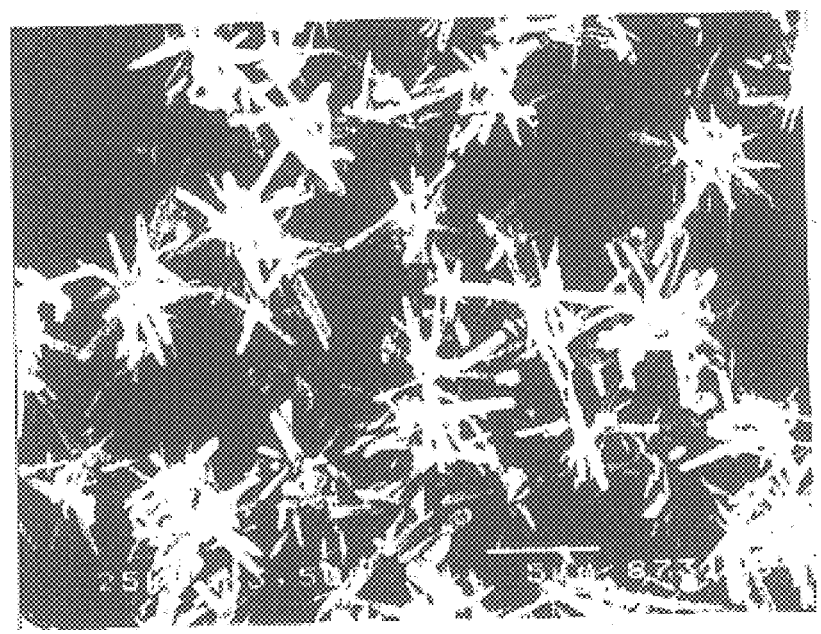
Figure 2:
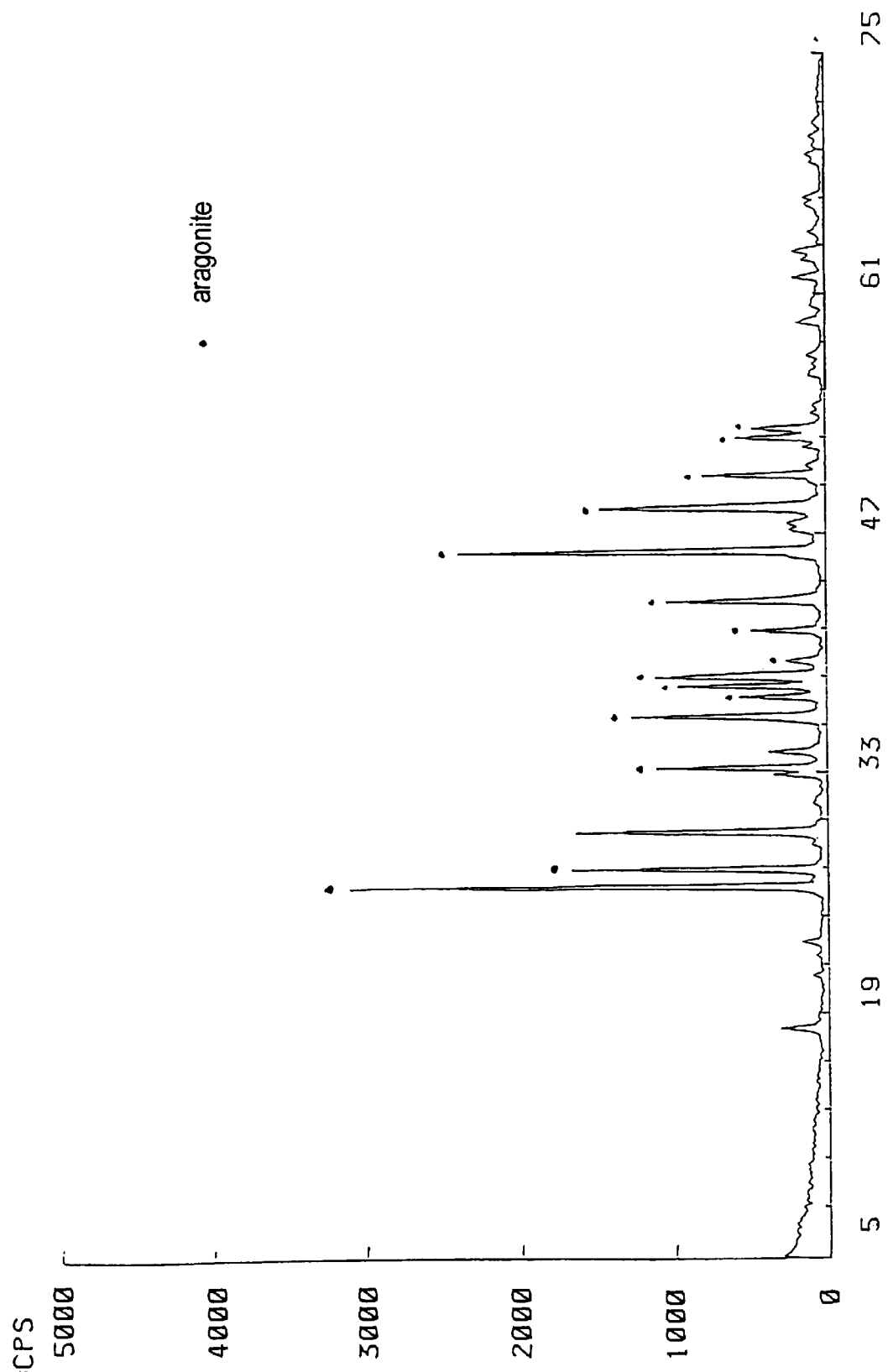
FIG. 2 is an X-ray diffraction spectrum of the product obtained in Example 1.
Figure 3:
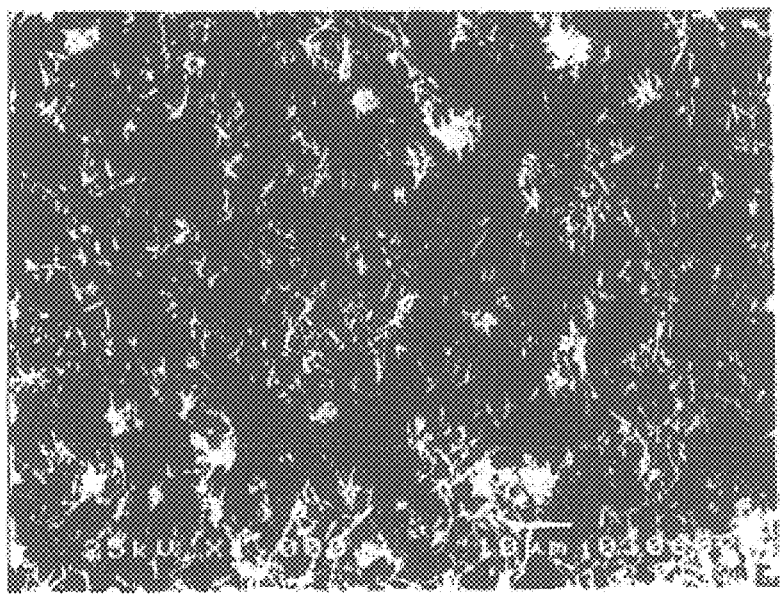
FIG. 3 is a scanning electron microphotograph showing the crystal particle structure of needle-like calcium carbonate obtained in Example 2.
Figure 3:
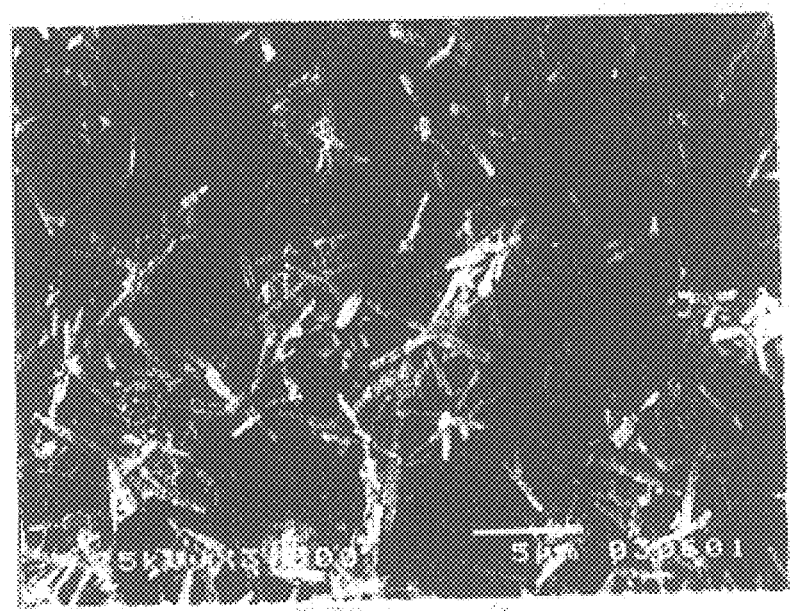
Figure 4:
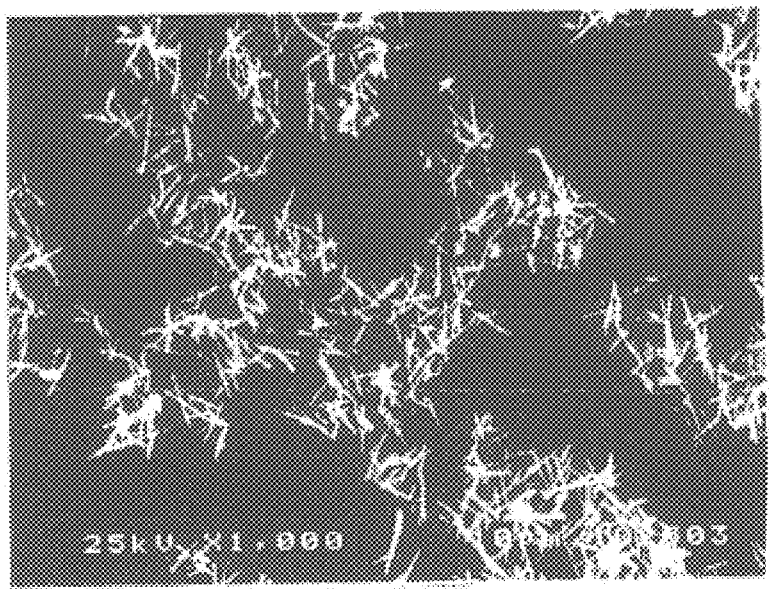
FIG. 4 is a scanning electron microphotograph showing the crystal particle structure of needle-like calcium carbonate obtained in Example 3.
Figure 4:
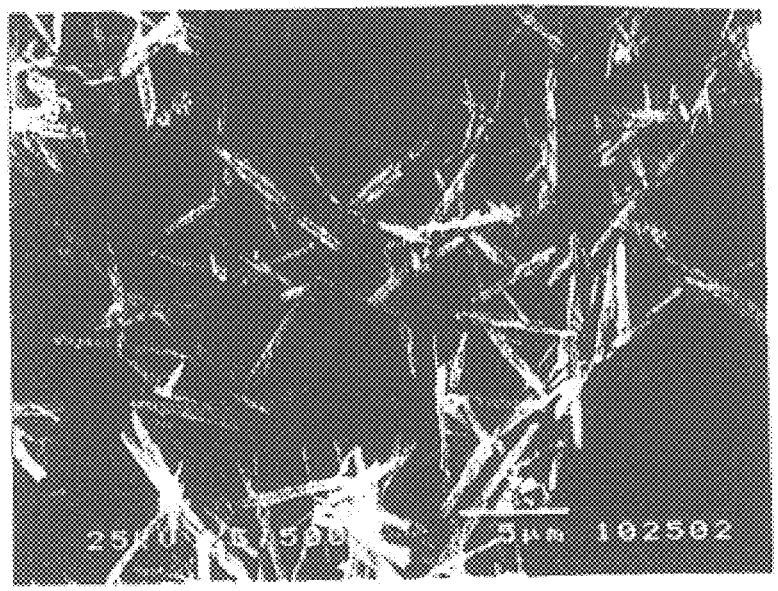
Figure 5:
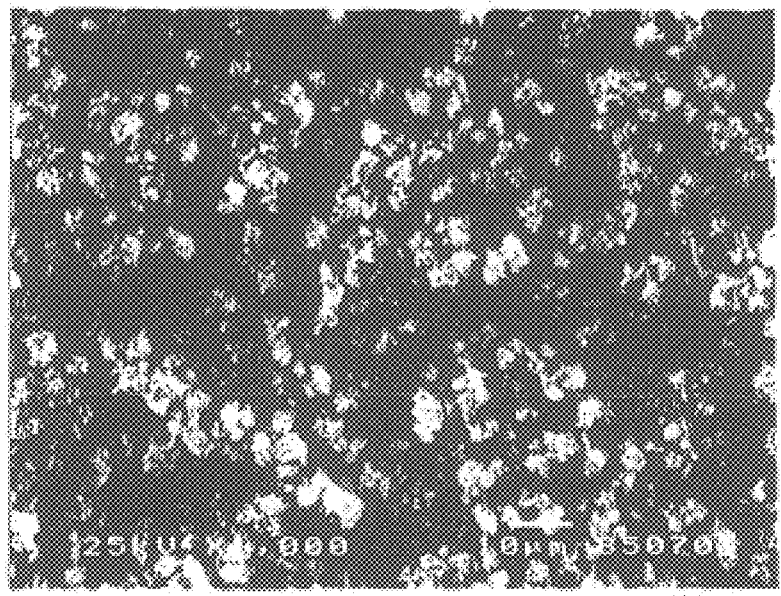
FIG. 5 is a scanning electron microphotograph showing the crystal particle structure of spindle-like calcium carbonate obtained in Example 4.
Figure 5:
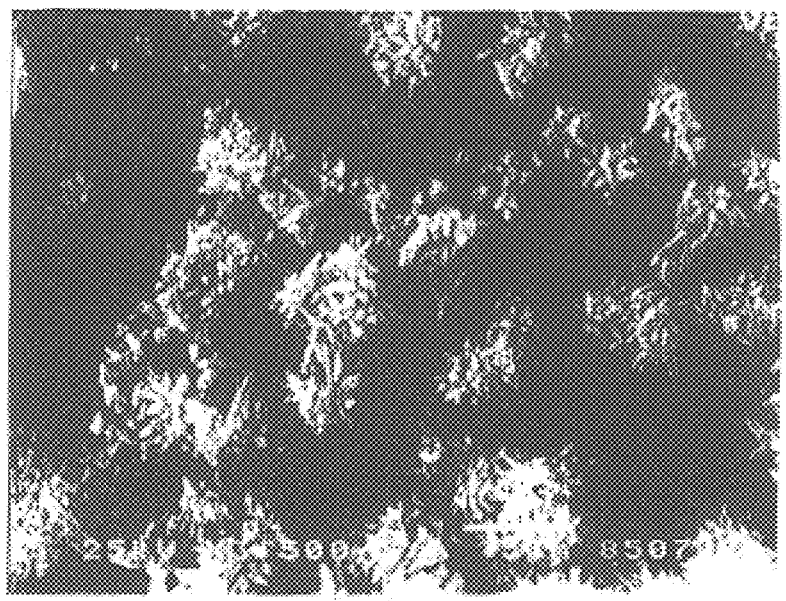
Figure 6:
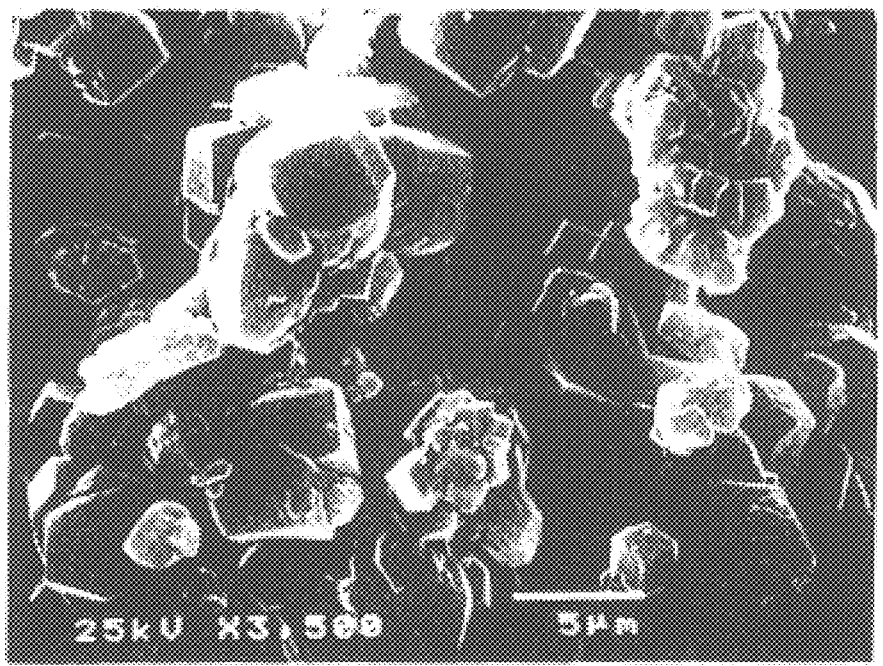
FIG. 6 is a scanning electron microphotograph showing the crystal particle structure of massive calcium carbonate obtained in Comparative example 4.
Figure 7:
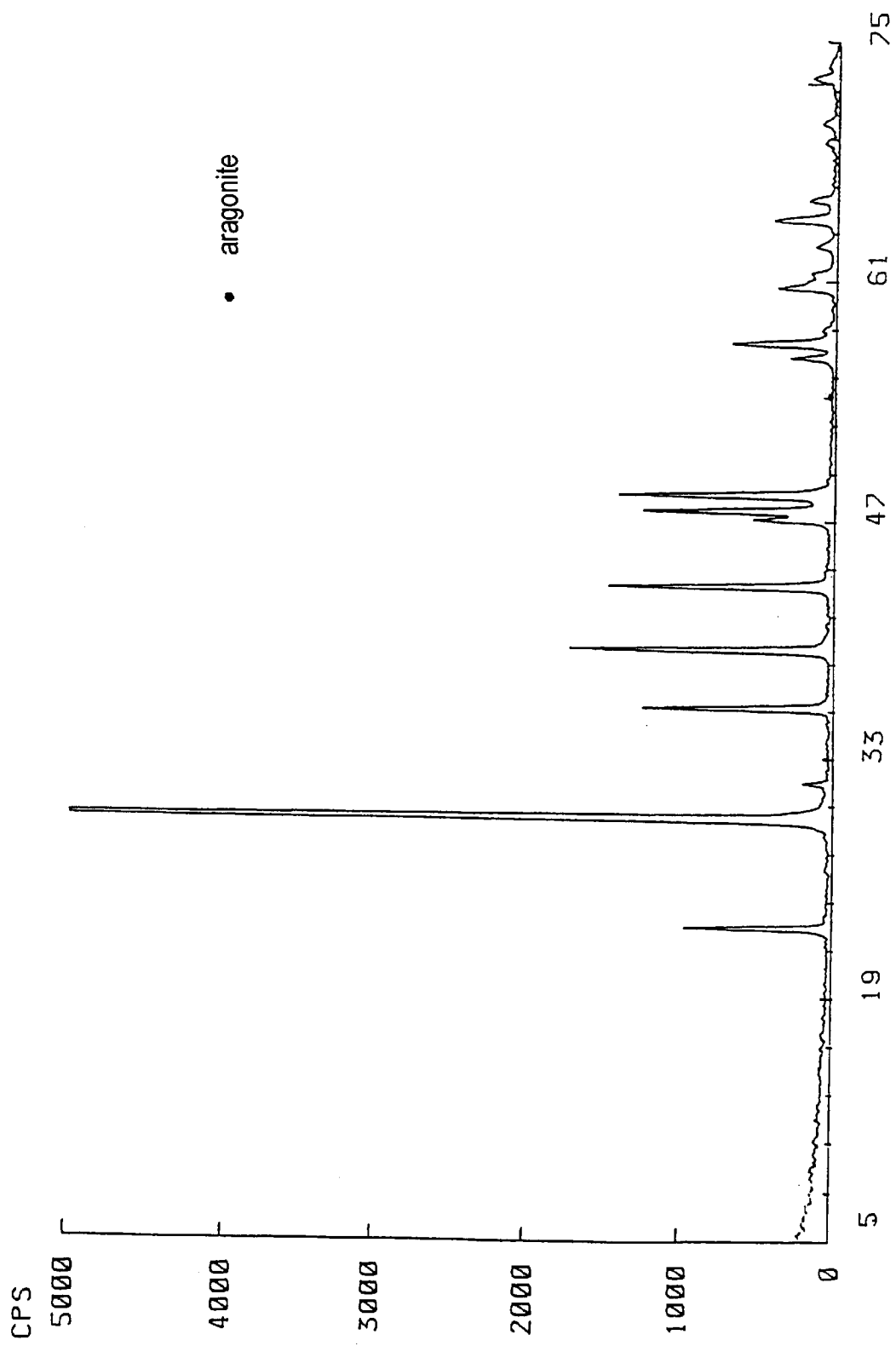
FIG. 7 is an X-ray diffraction spectrum of the product obtained in Comparative example 4.

Although the mechanism of the present invention has not been well explained, the calcium carbonate level in the quick lime and the pH value of the solution or the corresponding alkali level seem to have a significant influence on the properties of the milk of lime to influence the reaction state between the dissolved calcium hydroxide and carbonate ions during the subsequent addition of a green liquor. Sequential addition of a green liquor allows the dissolved calcium hydroxide to react with carbonate ions at a low ratio of carbonate ions during the initial stage, whereby crystals of calcium carbonate grow into a spindle or needle shape.

This calcium carbonate mainly has three features. Firstly, plastic wire abrasion resistance and wet end yield during high-speed paper making are improved. Secondly, bulk, opacity, brightness and body are improved when it is incorporated as a filler. Thirdly, gloss after printing and surface strength are improved when it is ground for use as a pigment. The first feature results from the spindle or needle-like primary particles which are more liable to entangle with fibers to improve the yield, thus decreasing the amount of the filler passing through wire parts. The spindle or needle-like particles are also advantageous for improving abrasion resistance because they have a high aspect ratio and less sharp edges to lower the frictional resistance during contact with wires. The second feature can be explained from electron microscopic observations of the surface/section of paper, which show that spindle- or needle-like calcium carbonate fills the gaps between pulp fibers as if they were microfibers and they are stiff enough to form many minute air spaces to provide good bulk, opacity and brightness. The third feature results from the spindle or needle-like particles having a particle diameter of 0.3 to 20 μm before grinding, which provides low gloss and improves ink absorption. The evenness of the particle diameter after grinding may improve printability such as glossiness after printing or the like.

The following examples illustrate the present invention as compared with comparative examples without, however, limiting the same thereto.

EXAMPLES

Test Method (1) Alkalinity: determined according to TAPPI 624 hm-85.

(2) Quick lime particle diameter: determined by a dry procedure according to JIS R 9001-1993.

(3) Calcium carbonate content in quick lime: determined from the $CO_2$ level measured by a metal carbon analyzer (EMIA-110 available from Horiba Ltd.).

(4) Average particle diameter of the product calcium carbonate: determined by a laser diffraction-type particle size distribution analyzer (Cirrus model 715) after the product was washed with water, filtered, and diluted with water. The minor and major diameters were actually measured by a scanning electron microscope (JSM-5300 available from JEOL Ltd.) after the product was washed with water, filtered and dried.

(5) Morphology: observed by a scanning electron microscope (JSM-5300 available from JEOL Ltd.) after the product was washed with water, filtered and dried.

(6) Crystal system: determined by an X-ray diffractometer RAD-2C available from Rigaku.

Example 1

In a 1 L four-necked flask (also used in the following examples and comparative examples), 50 g of a quick lime having a calcium carbonate content of 1.6% (and having a particle size distribution of 4.0% 150 μm or more, 18.1% 150–75 μm, 19.4% 75–45 μm, 58.5% 45 μm or less) was mixed with a weak liquor of pH 13.1 at a quick lime concentration of 30% by weight and then slaked to prepare a milk of lime, which was then causticized with a green liquor (composition: $Na_2CO_3$=110 g/L, $Na_2S$=34 g/L, NaOH=6 g/L, all expressed as $Na_2O$ in the same way as in the following examples and comparative examples) under the conditions of a green liquor loading rate of 0.22 cc/min/g (quick lime), loading period of 60 min, temperature of 80° C. and agitation speed of 450 rpm (using POWER STAIRRER TYPE PS-2N available from KYOEI as an agitator also used in the following examples and comparative examples). As a result of observations of the average particle diameter and morphology, the reaction product was found to be aragonite-type needle-like calcium carbonate having an average particle diameter of 7.0 μm in which primary particles have an average maximum diameter of 3.5 μm and an average minimum diameter of 0.4 μm. Experimental conditions and results are shown in Table 1.

Example 2

Using 50 g of a quick lime having a calcium carbonate content of 3.0% (and having a particle size distribution of 4.4% 150 μm or more, 17.4% 150–75 μm, 20.1% 75–45 μm, 58.1% 45 μm or less) and the same weak liquor and green liquor as used in Example 1, the quick lime was mixed with the weak liquor at a quick lime concentration of 40% by weight and then slaked to prepare a milk of lime, which was then causticized under the conditions of a green liquor loading rate of 0.11 cc/min/g (quick lime), loading period of 120 min, temperature of 85° C. and agitation speed of 1000 rpm. The product was found to be aragonite-type needle-like calcium carbonate having an average maximum diameter of 3.8 μm and an average minimum diameter of 0.3 μm. Experimental conditions and results are shown in Table 1.

Example 3

50 g of a kiln-recalcinated quick lime having a calcium carbonate content of 7% (and having an average particle diameter 10 mm) was mixed with the water supplied during the causticization step at pH 6.8 at a quick lime concentration of 50% by weight and then slaked to prepare a milk of lime, which was then causticized with the same green liquor as used in Example 1 under the conditions of a loading rate of 0.11 cc/min/g (quick lime), loading period of 120 min, temperature of 95° C. and agitation speed of 600 rpm. The product was found to be aragonite-type needle-like calcium carbonate having an average particle diameter of 8.0 μm in which primary particles have an average maximum diameter of 8.0 μm and an average minimum diameter of 0.4 μm. Experimental conditions and results are shown in Table 1.

Example 4

Using the same quick lime, weak liquor and green liquor as used in Example 1, the quick lime was mixed with the weak liquor at a quick lime concentration of 30% by weight and then slaked to prepare a milk of lime, which was then causticized with the green liquor under the conditions of a green liquor loading rate of 0.22 cc/min/g (quick lime), loading period of 60 min, temperature of 30° C. and agitation speed of 450 rpm. The product was found to be spindle-like calcium carbonate having an average particle diameter of 6.7 μm in which primary particles have an average maximum diameter of 1.2 μm and an average minimum diameter of 0.3 μm. Experimental conditions and the are shown in Table 1.

Example 5

Using the same quick lime as used in Example 2 and the same weak liquor and green liquor as used in Example 1, the quick lime was mixed with the weak liquor at a quick lime concentration of 40% by weight and then slaked to prepare a milk of lime, which was then causticized with the green liquor under the conditions of a green liquor loading rate of 0.11 cc/min/g (quick lime), loading period of 120 min, temperature of 40° C. and agitation speed of 750 rpm. The product was found to be spindle-like calcium carbonate having an average particle diameter of 6.0 μm in which primary particles have an average maximum diameter of 1.2 μm and an average minimum diameter of 0.3 μm. Experimental conditions and results are shown in Table 1.

Example 6

Using the same kiln-recalcinated quick lime, weak liquor and green liquor as used in Example 3, the quick lime was mixed with the weak liquor at a quick lime concentration of 40% by weight and then slaked to prepare a milk of lime, which was then causticized with the green liquor under the conditions of a green liquor loading rate of 0.11 cc/min/g (quick lime), loading period of 120 min, temperature of 50° C. and agitation speed of 750 rpm. The product was found to be spindle-like calcium carbonate having an average particle diameter of 5.4 μm in which primary particles have an average maximum diameter of 1.0 μm and an average minimum diameter of 0.3 μm. Experimental conditions and results are shown in Table 1.

Comparative Example 1

The procedure of Example 1 was repeated except that the pH of the liquor for slaking was 13.7. The reaction product was found to be amorphous or massive calcium carbonate having an average particle diameter of 8.2 μm Experimental conditions and results are shown in Table 2.

Comparative Example 2

The procedure of Example 2 was repeated except that the quick lime concentration during slaking was 14.7% by weight. The reaction product was found to be amorphous or massive calcium carbonate having an average particle diameter of 8.5 μm. Experimental conditions and results are shown in Table 2.

Comparative Example 3

The procedure of Example 3 was repeated except that the green liquor loading rate during causticization reaction was 0.88 cc/min/g (quick lime) and the loading period was 15 minutes. The reaction product was found to be amorphous or massive calcium carbonate having an average particle diameter of 9.5 μm. Experimental conditions and results are shown in Table 2.

Comparative Example 4

The procedure of Example 3 was repeated except that the calcium carbonate content in the quick lime was 15%. The reaction product was found to be amorphous or massive calcium carbonate having an average particle diameter of 10.8 μm. Experimental conditions and results are shown in Table 2.

Comparative Example 5

The procedure of Example 5 was repeated except that the reaction temperature during causticization reaction was 15° C. The reaction product was found to be amorphous or massive calcium carbonate having an average particle diameter of 9.1 μm. Experimental conditions and results are shown in Table 2.

Comparative Example 6

Commercially available heavy calcium carbonate SS-1200 (having an average particle diameter 4.4 μm available from Shiraishi Kogyo) was used.

Application Example 1

To a single slurry of hardwood bleached chemical pulp having a Canadian standard freeness (hereinafter referred to as C.S.F.) of 300 ml were internally added 0.02% of a sizing agent (alkyl ketene dimer), 0.5% of a sulfate band, 0.3% of cationically modified starch, 15% of each calcium carbonate obtained in Examples 1 to 6 and Comparative examples 1 to 6 and 200 ppm of a yield improver (polyacrylamide having an anionic molecular weight of 4,000,000 to 5,000,000) was converted into paper by a test machine. The thus obtained paper was conditioned at 20° C., 65% RH for a night and a day, then tested for basis weight, density, brightness, opacity and smoothness. The yield and wire abrasion resistance tests of the fillers were also performed. Test methods are described below and results are shown in Tables 1 and 2.

TABLE 1

| | Example | | | | | |
|---|---|---|---|---|---|---|
| | 1 | 2 | 3 | 4 | 5 | 6 |
| $CaCO_3$ content % | 1.6 | 3.0 | 7.0 | 1.6 | 3.0 | 7.0 |
| Slaking pH | 13.1 | 13.1 | 6.8 | 13.1 | 13.1 | 6.8 |
| Slaking level % | 30 | 40 | 50 | 30 | 40 | 50 |
| Green liquor g/L | $Na_2CO_3$ = 110, $Na_2S$ = 34, NaOH = 6 | | | | | |
| Green liquor loading rate cc/min/g (quick lime) | 0.22 | 0.11 | 0.11 | 0.22 | 0.11 | 0.11 |
| Caustification temperature ° C. | 80 | 85 | 95 | 30 | 40 | 50 |

TABLE 1-continued

| | Example | | | | | |
|---|---|---|---|---|---|---|
| | 1 | 2 | 3 | 4 | 5 | 6 |
| Agitation speed, rpm | 450 | 1000 | 600 | 450 | 750 | 750 |
| Particle shape | needle | needle | needle | spindle | spindle | spindle |
| Particle diameter μm | | | | | | |
| Average | 7.0 | 3.8 | 8.0 | 6.7 | 6.0 | 5.4 |
| Minor diameter | 0.4 | 0.3 | 0.4 | 0.3 | 0.3 | 0.3 |
| Major diameter | 3.5 | 3.8 | 8.0 | 1.2 | 1.2 | 1.0 |
| Basis weight (g/cm$^2$) | 54.1 | 54.0 | 54.1 | 54.2 | 54.1 | 54.1 |
| Density (g/cm$^3$) | 0.59 | 0.58 | 0.58 | 0.58 | 0.59 | 0.59 |
| Smoothness (sec) | 33 | 33 | 33 | 32 | 33 | 32 |
| Air permeability (sec) | 6 | 6 | 6 | 4 | 4 | 4 |
| Yield (%) | 53 | 52 | 53 | 51 | 51 | 50 |
| Brightness (%) | 89.7 | 89.8 | 89.7 | 89.7 | 89.6 | 89.7 |
| Opacity (%) | 82.8 | 82.8 | 82.9 | 82.7 | 82.6 | 82.6 |
| Clark stiffness (cm) | 13.6 | 13.5 | 13.5 | 13.2 | 13.3 | 13.2 |
| Plastic wire abrasion (mg) | 22 | 20 | 23 | 22 | 22 | 23 |

TABLE 2

| | Comparative example | | | | | |
|---|---|---|---|---|---|---|
| | 1 | 2 | 3 | 4 | 5 | 6 |
| $CaCO_3$ content % | 1.6 | 3.0 | 7.0 | 15 | 3.0 | Commercial heavy $CaCO_3$ |
| Slaking pH | 13.7 | 13.1 | 6.8 | 6.8 | 13.1 | |
| Slaking level % | 30 | 14 | 50 | 50 | 40 | |
| Green liquor g/L | $Na_2CO_3$ = 110, $Na_2S$ = 34, NaOH = 6 | | | | | |
| Green liquor loading rate cc/min/g (quick lime) | 0.22 | 0.11 | 0.88 | 0.11 | 0.11 | |
| Caustification temperature ° C. | 80 | 85 | 95 | 95 | 15 | |
| Agitation speed, rpm | 450 | 1000 | 600 | 600 | 750 | |
| particle shape | mass | mass | mass | mass | mass | mass |
| Particle diameter μm | | | | | | |
| Average | 8.2 | 8.5 | 9.5 | 10.8 | 9.1 | 4.4 |
| Minor diameter | | | | | | |
| Major diameter | | | | | | |
| Basis weight (g/cm$^2$) | 54.1 | 54.0 | 54.1 | 54.2 | 54.1 | 54.1 |
| Density (g/cm$^3$) | 0.62 | 0.62 | 0.63 | 0.63 | 0.62 | 0.63 |
| Smoothness (sec) | 30 | 31 | 31 | 30 | 30 | 31 |
| Air permeability (sec) | 3 | 3 | 3 | 3 | 3 | 3 |
| Yield (%) | 48 | 47 | 48 | 47 | 46 | 46 |
| Brightness (%) | 88.0 | 88.1 | 88.0 | 88.0 | 88.2 | 88.1 |
| Opacity (%) | 79.3 | 79.3 | 79.4 | 79.2 | 79.2 | 79.4 |
| Clark stiffness (cm) | 13.0 | 13.1 | 13.0 | 12.9 | 12.9 | 13.0 |
| Plastic wire abrasion (mg) | 130 | 120 | 115 | 125 | 125 | 119 |

Test method
  (1) Wire abrasion test
    Tester: Nippon Filcon abrasion tester
    Wire: Nippon Filcon COS-60 polyester wire
    Slurry concentration: 2% by weight
    Load: 1250 g
    Abrasion period: 90 min
    Abrasion wear: wire weight loss after abrasion test (mg).
  (2) Yield
    Tested pulp: beaten to C.S.F. 300ml
    Stuff concentration: 0.5% by weight (pulp/filler=60/40)

Loading order: pulp→sulfate band (1%)→cationized starch (0.2%)→filler→colloidal silica (0.02%) (loading is indicated in parentheses as% by weight of pulp)

Tester: brit jar tester

Test conditions: shear during loading at 700 rpm shear during measurement at 1500 rpm 200-mesh wire measurement of first pass retention of stuff Application Example 2

Each paper prepared in Application example 1 was surface size-pressed with oxidized starch in a size press to a dry weight of 2 g/m$^2$, and dried, then subjected to soft calendering (available from Minamisenju, 60° C., constant rate of 50 kg/cm). A 64% coating solution containing 60% by weight of heavy calcium carbonate having an average particle diameter of 0.6 μm (tradename: Hydrocarbo 90 available from Shiraishi Calcium), 40% by weight of kaolin having an average particle diameter of 0.5 μm (tradename: Ultrawhite 90 available from Engelhard Inc.), 4% by weight of phosphate esterified starch as an adhesive, 10% by weight of a styrene-butadiene latex and 0.3% by weight of a dispersant was applied on both faces at 10 g/m$^2$ per each face by a test blade coater and dried. The thus obtained coated paper was evaluated in accordance with the following quality evaluation test and results are shown in Tables 3 and 4.

TABLE 3

| | Example | | | | | |
|---|---|---|---|---|---|---|
| | 1 | 2 | 3 | 4 | 5 | 6 |
| Density (g/cm$^3$) | 0.79 | 0.80 | 0.79 | 0.81 | 0.81 | 0.80 |
| Smoothness (sec) | 100 | 100 | 100 | 99 | 99 | 99 |
| Opacity (%) | 88 | 88 | 88 | 88 | 88 | 88 |
| Glossiness before printing (%) | 23 | 23 | 23 | 22 | 22 | 22 |
| Glossiness after printing (%) | 48 | 47 | 48 | 47 | 47 | 47 |
| Stiffness (cm$^3$/100) | 92 | 90 | 92 | 86 | 87 | 85 |

TABLE 4

| | Comparative example | | | | | |
|---|---|---|---|---|---|---|
| | 1 | 2 | 3 | 4 | 5 | 6 |
| Density (g/cm$^3$) | 0.91 | 0.92 | 0.90 | 0.91 | 0.91 | 0.90 |
| Smoothness (sec) | 85 | 85 | 85 | 84 | 85 | 84 |
| Opacity (%) | 85 | 86 | 86 | 86 | 85 | 86 |
| Glossiness before printing (%) | 20 | 20 | 20 | 20 | 20 | 20 |
| Glossiness after printing (%) | 45 | 44 | 45 | 44 | 45 | 45 |
| Stiffness (cm$^3$/100) | 66 | 65 | 62 | 66 | 64 | 65 |

Quality evaluation method (1) Glossiness before printing: determined according to JIS P-8142.

(2) Smoothness: determined by a JAPAN Tappi No. 5 OHKEN-type smoothness tester.

(3) Opacity: determined according to JIS P-8138.

(4) Body: determined by a Clark stiffness tester according to JIS P-8143.

(5) Glossiness after printing: determined at an angle of 75° according to JIS P-8142 after printing at a constant ink rate of 0.35 cc using an RI printer (Min) with Diatone GSL red available from Sakata Inks.

ADVANTAGES OF THE INVENTION

As shown in Examples 1 to 6, calcium carbonate according to the present invention was spindle- and needle-like calcium carbonate. The white liquors prepared with a weak liquor sampled from the causticization step for slaking quick lime were found to have compositions comparable to conventional conditions.

The results of the paper quality tests of Application example 1 showed that calcium carbonate of the present invention had high bulk, brightness, opacity, smoothness and air permeability as well as excellent yield and plastic wire abrasion resistance of the filler.

The coated papers of Application example 2 showed excellent results in bulk, smoothness, opacity and stiffness.

Moreover, the process of the present invention could greatly reduce production costs because it could prepare calcium carbonate with a controlled shape using the conventional causticization step without significant change.

What is claimed is:

1. A process for preparing calcium carbonate which is useful as a paper filler by utilizing a causticization step of a sulfate or soda pulp process, comprising:

(A) (i) adding a liquor having a pH of 5.5 to 13.5 to a quick lime containing 0.1 to 10% by weight of calcium carbonate on the basis of the weight of the quick lime to a concentration of said quick lime of 20 to 60% by weight based on said quick lime, and (ii) slaking said quick lime with stirring or kneading to prepare a lime slurry, (B) subjecting said lime slurry to a causticization reaction at a reaction temperature of 20 to 105° C. by adding a green liquor generated in the causticization step of the sulfate or soda pulp process at a loading rate of 0.02 to 0.5 cc (green liquor)/min/g (quick lime), and then (C) recovering calcium carbonate having a spindle- or needle-like shape.

2. The process of claim 1 wherein said liquor having a pH of 5.5 to 13.5 is a weak liquor generated in the causticization step.

3. The process of claim 1 wherein the quick lime used during the slaking reaction of step (A) is selected from the group consisting of (a) a calcination product of a limestone based on calcium carbonate, (b) a calcination product of calcium carbonate generated during conversion of sodium carbonate into sodium hydroxide in the causticization step of the sulfate or soda pulp process, and (c) a mixture thereof.

4. A process for preparing calcium carbonate which is useful as a paper filler, comprising:

(A) (i) adding a liquor having a pH of 5.5 to 13.5 to a quick lime containing 0.1 to 10% by weight of calcium carbonate on the basis of the weight of the quick lime to a concentration of said quick lime of 20 to 60% by weight based on said quick lime, and (ii) slaking said quick lime with stirring or kneading to prepare a lime slurry, (B) subjecting said lime slurry to a causticization reaction at a reaction temperature of 20 to 105° C. by adding a green liquor generated in a causticization step of a sulfate or soda pulp process at a loading rate of 0.02 to 0.5 cc (green liquor)/min/g (quick lime), and then (C) recovering calcium carbonate having a spindle- or needle-like shape as a reaction product of said causticization reaction.

* * * * *